United States Patent [19]
Tubbs

[11] Patent Number: 6,067,792
[45] Date of Patent: May 30, 2000

[54] APPARATUS FOR CONTROLLING COOLING AIR IN GAS TURBINE ENGINE

[75] Inventor: Henry Tubbs, Tetbury, United Kingdom

[73] Assignee: Rolls-Royce plc, London, United Kingdom

[21] Appl. No.: 08/953,006

[22] Filed: Oct. 16, 1997

[30] Foreign Application Priority Data

Nov. 12, 1996 [GB] United Kingdom ............. 9623481

[51] Int. Cl.[7] .................................. F02C 7/12
[52] U.S. Cl. ........................ 60/39.75; 415/115
[58] Field of Search .................. 60/39.02, 39.07, 60/39.29, 39.75; 415/115

[56] References Cited

U.S. PATENT DOCUMENTS

| 4,709,546 | 12/1987 | Weiler . | |
| 4,785,624 | 11/1988 | Smith et al. | 60/39.07 |
| 4,807,433 | 2/1989 | Maclin et al. | 60/39.29 |
| 5,157,914 | 10/1992 | Schwarz et al. | 60/39.29 |

FOREIGN PATENT DOCUMENTS

| 0250323A1 | 12/1987 | European Pat. Off. . | |
| 0543627A1 | 5/1993 | European Pat. Off. . | |
| 61-187538 | 8/1986 | Japan | 60/39.29 |
| 1-45926 | 2/1989 | Japan | 60/39.29 |
| 1338354 | 10/1971 | United Kingdom . | |
| 1493008 | 11/1977 | United Kingdom . | |
| 2246836A | 12/1992 | United Kingdom . | |
| WO95/31631A1 | 12/1987 | WIPO . | |

*Primary Examiner*—Louis J. Casaregola
*Attorney, Agent, or Firm*—W. Warren Taltavull; Farkas & Manelli PLLC

[57] ABSTRACT

In a gas turbine engine, compressor delivery air is fed into air inlets in hollow turbine nozzle guide vanes, and then ejected into the gas stream via holes in the vane walls. Valving is provided so as to provide modulation of the cooling airflow over and above the modulation achieved by compressor output when it changes with engine power setting. Excessive cooling of the gas stream is thus prevented.

3 Claims, 2 Drawing Sheets

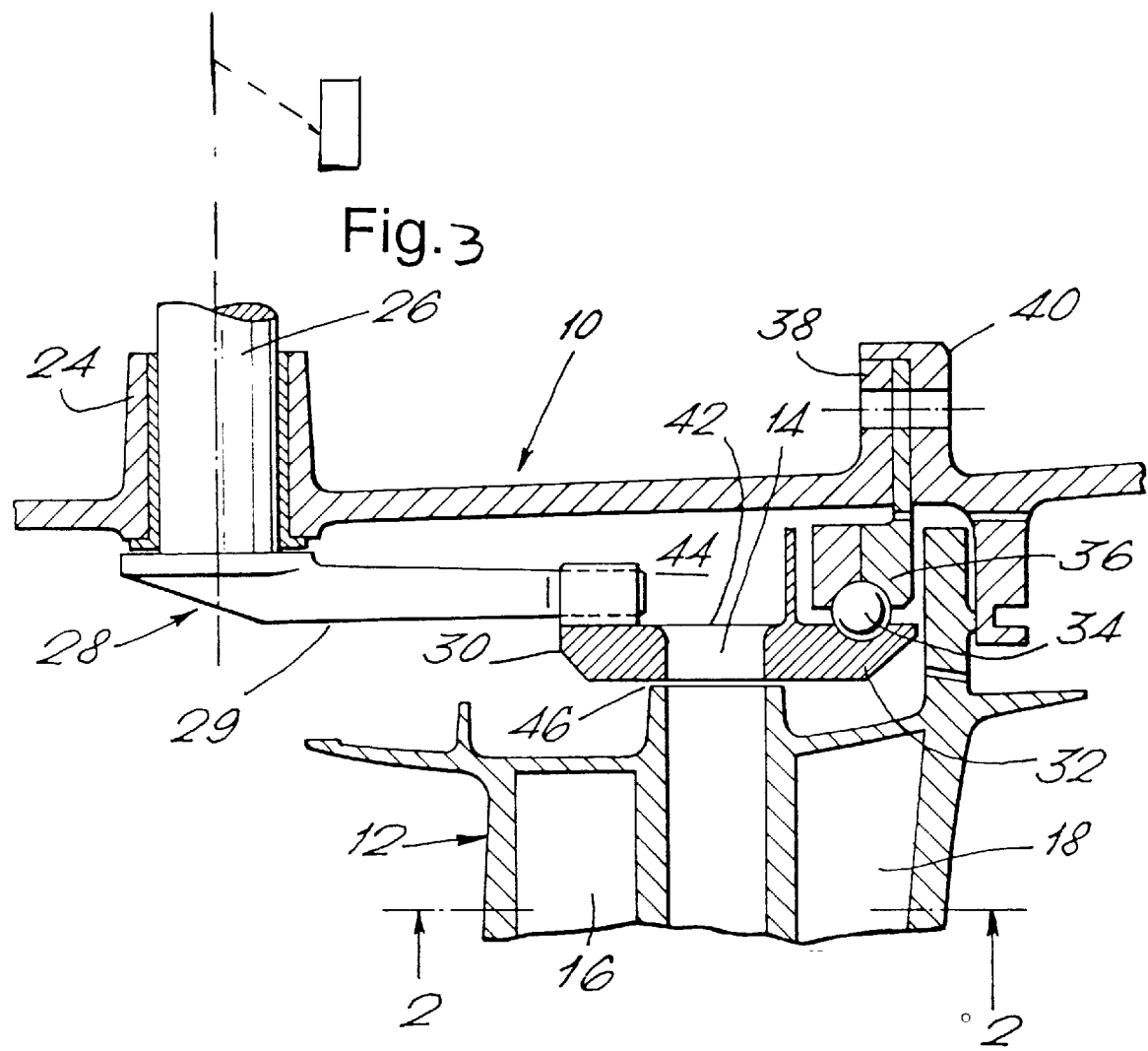

APPARATUS FOR CONTROLLING COOLING AIR IN GAS TURBINE ENGINE

FIELD OF THE INVENTION

The present invention relates to the control of cooling air-flow to components comprising the turbine section of a gas turbine engine during operation thereof.

BACKGROUND OF THE INVENTION

The present invention provides both a method of controlling a said cooling airflow and apparatus for effecting said control.

Gas turbine engines operate over a varying range of conditions, eg those powering an aircraft are required to run at idle speeds, taxiing speeds of an associated aircraft, take off speeds, cruise speeds and landing speeds of that aircraft. All these regimes require different power outputs which, in order to ensure maximum engine operating efficiency during each regime, must be achieved at maximum design gas temperatures.

Some operating regimes, eg take off and climb of an associated aircraft, generate gas temperatures which make it essential to cool the vanes and rotor blades of the gas turbine engine. Cooling is achieved by introducing compressor driven air to the interior of the vanes and discharging it through the walls thereof, to the gas stream in which the vanes and blades of the turbine lie.

Prior art arrangements always introduce the maximum quantity of cooling air necessary, which is dictated by the speed of rotation of the compressor, which in turn is dictated by the flight regime of the associated aircraft, ie take off or climb or any of the regimes named hereinbefore. In all operating regimes except take off and climb, an excessive supply of cooling air results, to the extent that engine efficiency is impaired.

SUMMARY OF THE INVENTION

The present invention seeks to provide an improved method of controlling the cooling airflow in the turbine structure of a gas turbine engine.

The present invention further seeks to provide apparatus with which to effect said improved control.

According to one aspect of the present invention, in a gas turbine engine a method of controlling a cooling airflow from a compressor thereof, into vanes of the turbine thereof, which vanes have cooling air inlets and outlets, includes the step of effectively varying the cross-sectional area of said cooling air inlets between maximum and minimum values in coincidence with change in engine power settings during operation, so as to supplement that change in cooling airflow thereto resulting in change in compressor output in consequence of said changes in engine power settings.

According to a further aspect of the present invention a gas turbine engine comprises a turbine having guide vanes with cooling air inlets connected for receipt of a cooling airflow from an associated compressor and means for controlling said airflow at said inlets connected for receipt of a cooling airflow from an associated compressor and means for controlling said airflow at said inlets, said means being movable between positions wherein it blocks at least a major portion of each said inlet and wherein it fully exposes said inlets, the magnitude of said movement and therefore the magnitude of blocking effect of said inlets being dictated by said engine power setting.

BRIEF DESCRIPTION OF THE DRAWINGS

This invention will now be described by way of example and with reference to the accompanying drawings in which:

FIGS. 1 and 3 are axial, cross-sectional part views through gas turbine engine turbine structure incorporating examples of the present invention, and FIGS. 2 and 3 are views on line 2—2 of FIG. 1.

DETAILED DESCRIPTION

Figure 1:
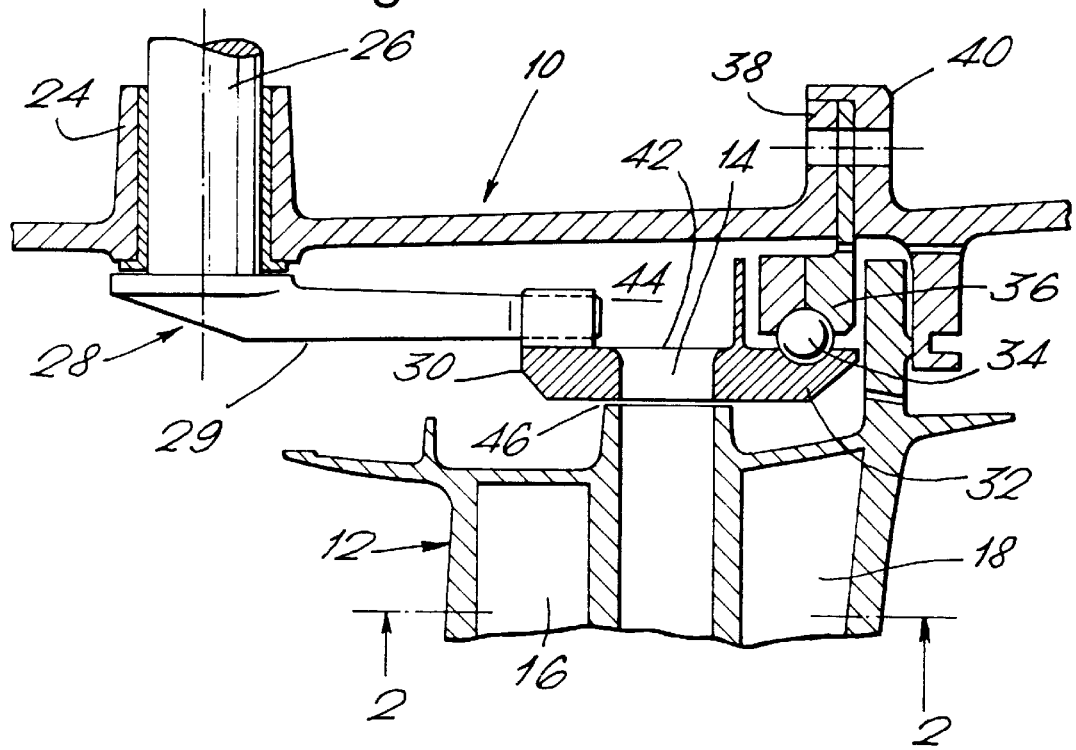

Referring to FIG. 1. A turbine casing 10 of a gas turbine engine (not shown) surrounds a stage of guide vanes in known manner, only one vane being shown and numbered 12.

The stage of vanes is supported in generally known manner (not shown) via their radially inner ends (not shown).

Figure 2:
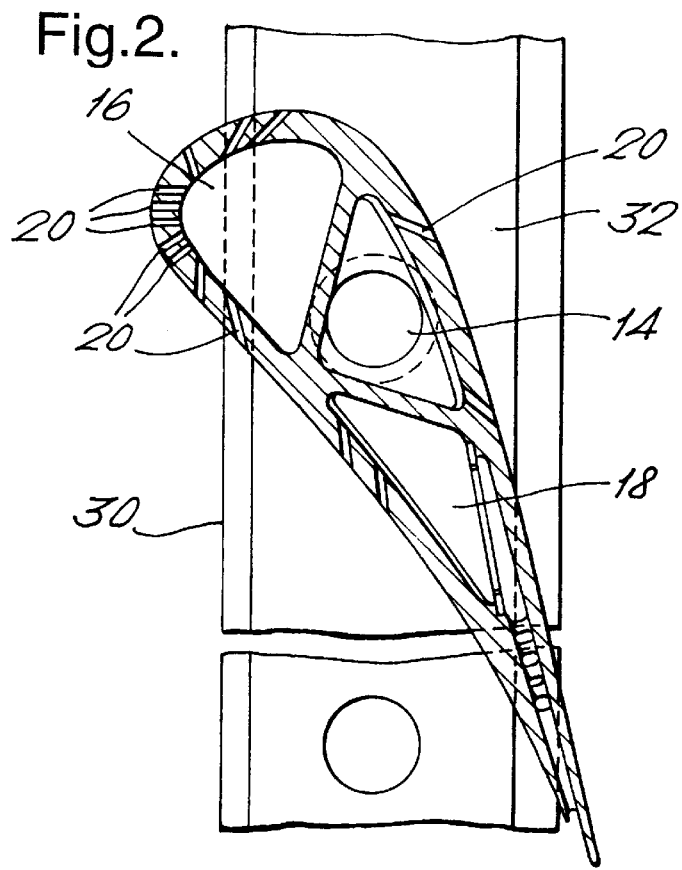

Each vane 12 of the stage of guide vanes has a cooling air inlet 14 at its radially outer end and during operation of the associated engine, a compressor (not shown) thereof delivers air to each inlet 14 which leads to a passageway 50. The air then passes from the interior of each vane 12 to the gas stream in which the vanes 12 lie, eg via apertures 20 (FIG. 2) in the walls of passageway 50.

Two or more hollow bosses 24, of which only one is shown, are provided in the turbine casing 10. However many bosses 24 are provided and they are positioned equi-angularly spaced about the casing 10, in a common radial plane.

Each boss 24 contains a pivot shaft 26 by a bell crank lever 28, which is connected via an arm 29 to a ring 30. The ring 30, in turn, has a land 32 which provides a bearing track for ball bearings 34. A flanged outer bearing track 36 is fixed between flanges 38,40 formed on casing 10.

The ring 30 has holes 42 extending through it. The holes 42 are equal in number to the guide vanes 12 and in one operative position, are aligned with the air inlets 14, so as to enable the maximum cooling airflow therethrough to the vanes interiors.

The ring 30 is radially spaced from the air inlets 14 by a small gap 46, so as to allow at least a small cooling airflow into the vanes 12 at all operating times, regardless of the manner of alignment of holes 42 and air inlets 14.

In operation of an associated engine (not shown) the positional relationship between the holes 42 and air inlets 14 will be changed as engine power requirement changes; thus, on take off of an aircraft (not shown) powered by a said engine, full power is needed, which generates gas temperatures sufficiently high as to make necessary the provision of the maximum possible cooling airflow from the compressor of the engine, to the guide vanes 12. The bell crank levers 20 will be actuated by any known suitable means (not shown) so as to pivot in bosses 24 and via their respective arms 29, causing the ring 30 to rotate about the axis of the engine (not shown) until each hole 42 is fully aligned with a respective air inlet 14. Maximum cooling airflow will then enter the guide vane 12 interiors and then pass to the gas stream via holes 20.

When the associated aircraft (not shown) reaches its cruise altitude, the engine (not shown) is throttled so as to reduce its power output. As a consequence of this, the engine compressor (not shown) reduces its output of cooling air. However, the reduction is insufficient to prevent a now excessive cooling airflow to the vanes 12 and subsequently to the gas stream. Consequently, the bell crank levers 28 are actuated again, this time to move the ring 30 and therefore the holes 42, out of alignment with the air inlets 14, thus modulating the cooling airflow into the vanes 12, by an amount which will ensure sufficient cooling thereof, but will avoid reducing engine operating efficiency.

Actuation of the bell crank levers 28 can be achieved by suitable means, eg a powered ram mechanism as in FIG. 3, or quadrant gears connected between a motor and the bell crank levers 28. Whatever the means, it can be connected between operating signal generating means (not shown) and an engine shaft revolution counter, or a gas temperature indicator, or a compressor pressure sensing device, none of which are shown, but all of which per se are well known in the gas turbine engine field for providing signals electronically convertible to enable actuation of a variety of devices.

Whilst the invention as described hereinbefore, is limited to the use of a rotary valve 30, the man skilled in the field, having read this specification, will appreciate that if movement of the ring axially of the engine would be more convenient, say for constructional reasons, an adaptation of the example would easily be achieved. Thus, the bell crank levers 28 would become redundant and the ram mechanism (not shown) would be directly connected to push and pull the ring in the said axial sense. A further necessary adaptation would be to provide a bearing device (not shown) to enable and support the axial movement of the ring 30.

A further embodiment could comprise plungers (not shown) radially aligned about the engine axis and with the air inlets 14. The plungers would be resiliently loaded in a direction radially outwardly of the air inlets 14 and be acted upon by cams (not shown) on ring 30, when the ring 30 is caused to rotate.

The plungers radially inner ends would be coned and, on full engine power being selected, ring 30 would be rotated so as to remove the cams from the plungers, which would move on a radial path away from the air inlets 14. On cruise power being selected, the ring 30 would be rotated so as to cause the cams to urge the plungers into the air inlets 14, a distance sufficient to reduce their area, but not entirely block them.

I claim:

1. A gas turbine engine comprising a turbine having guide vanes with cooling air inlets connected for receipt of a cooling airflow from an associated compressor and means for controlling said airflow at said inlets, said means being movable between positions wherein it blocks at least a major portion of each said inlet and wherein it fully exposes said inlets, the magnitude of said movement and therefore the magnitude of blocking of said inlets being in response to a setting of the engine power, said movable means comprising a ring which surrounds the vanes in the plane of said inlets in close spaced relationship, said ring containing holes equal in number to the vanes and equal in area to each respective air inlet and aligned therewith at least in one position, said ring being rotatable so as to displace each hole relative to a respective air inlet.

2. A gas turbine engine as claimed in claim 1 wherein said ring is rotated by at least one pivotal bell crank lever on a casing surrounding said vanes and connected via one end to the ring and via the other end to moving means for effecting said rotation.

3. A gas turbine engine as claimed in claim 2 wherein said moving means comprises a ram mechanism.

* * * * *